Figure 1:
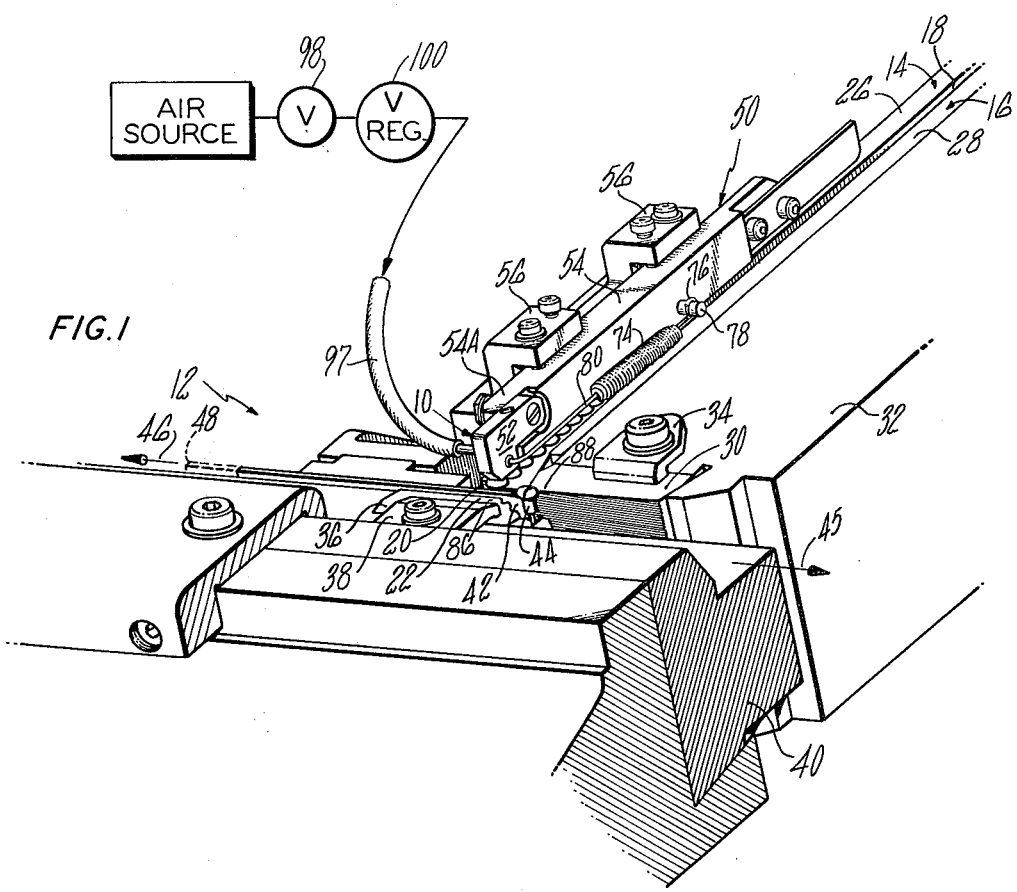

United States Patent [19]
Babiarz

[11] 3,952,884
[45] Apr. 27, 1976

[54] APPARATUS FOR FEEDING HEADED WORK BLANKS

[75] Inventor: Chester Thomas Babiarz, Windsor Locks, Conn.

[73] Assignee: The Hartford Special Machinery Company, Simsbury, Conn.

[22] Filed: Feb. 26, 1975

[21] Appl. No.: 553,243

[52] U.S. Cl. .............................. 214/8.5 E; 302/2 R
[51] Int. Cl.² .......................................... B65G 53/00
[58] Field of Search ...................... 214/8.5 E, 8.5 R; 302/2 R; 221/1, 163

[56] References Cited
UNITED STATES PATENTS

| | | | |
|---|---|---|---|
| 2,760,679 | 8/1956 | Chadderton | 214/8.5 E |
| 3,625,570 | 12/1971 | Ford | 214/8.5 E |

Primary Examiner—Philip Goodman
Attorney, Agent, or Firm—Prutzman, Hayes, Kalb & Chilton

[57] ABSTRACT

A headed work blank feeding apparatus is provided including a movable track extension cover at a discharge end of a pair of spaced feed rails. The feed rails are located in adjacent upstream relation to a work station entrance. A height adjustment device serves to selectively establish clearance between a bottom guide face of the extension cover and the feed rails at their discharge end upstream of the work station entrance. Air ejection means on the track extension cover is in overlying relation to the entrance of the work station for positively seating each headed work blank discharged from the feed rails onto work blank supporting surfaces at the entrance of the work station.

10 Claims, 3 Drawing Figures

APPARATUS FOR FEEDING HEADED WORK BLANKS

This invention generally relates to work blank forming machines such as thread rollers, slot formers, point formers and similar machines and particularly concerns apparatus for feeding headed work blanks into a work station in the machine, which aparatus is of a general type described in U.S. Pat. No. 3,472,400 entitled "Variable Air Jet Delivery System" and assigned to the assignee of this invention.

A primary object of this invention is to provide a new and improved work blank feeding apparatus which significantly increases reliability and production rates in continuous controlled guidance of headed work blanks, even of extremely small size, to a work station. Included in this object is the provision of such apparatus which can be precisely adjusted to customize the feed of work blanks in accordance with their size and mass distribution to ensure a precisely controlled, high speed guided delivery to the work station with minimum interruption in machine production.

Another object of this invention is to provide a new and improved work blank feeding apparatus which is movable from an operative position to an inoperative position for removing malformed work blanks from the feeding apparatus with minimum disturbance to the blanks being fed during clearing of the machine.

A further object of this invention is to provide a new and improved work blank feeding apparatus which may be incorporated into existing machines as well as being installed for use in new machines and which has a relatively simple but rugged construction to provide dependable service over an extended service life under adverse conditions.

Other objects will be in part obvious and in part pointed out more in detail hereinafter.

A better understanding of this invention will be obtained from the following detailed description and the accompanying drawing of an illustrative application of this invention.

Figure 2:
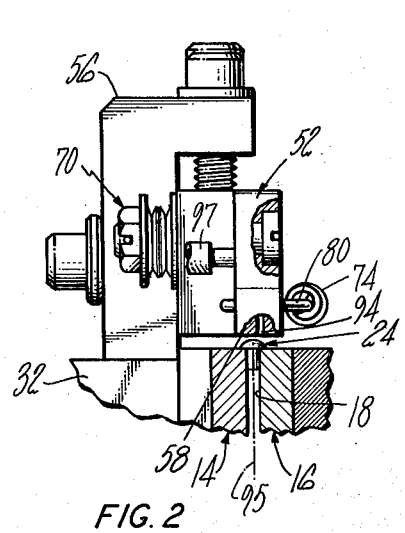
Figure 3:
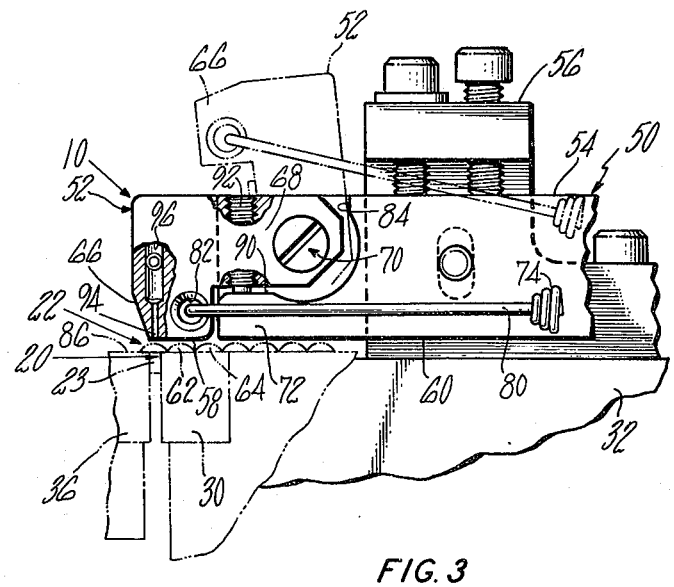

In the drawing:

FIG. 1 is an isometric view, partly broken away and partly in section, showing a machine incorporating a work blank feeding apparatus constructed in accordance with this invention;

FIG. 2 is an enlarged end elevational view, partly broken away and partly in section, showing a discharge end of a track extension cover of the work blank feeding apparatus of this invention; and FIG. 3 is an enlarged side elevational view, partly broken away and partly in section, of the track extension cover of FIG. 2 which is illustrated in an operative position in full lines and in a retracted inoperative position shown in broken lines.

Referring to the drawing in detail, a work blank feeding apparatus 10 of this invention is shown installed on a portion of a machine 12 which for purposes of this description will be considered to be a thread rolling machine of a type disclosed in U.S. Pat. No. 3,117,473 entitled "Thread Rolling Machine" and assigned to the assignee of this invention.

While this invention is described for purposes of illustration in connection with a thread roller, it is to be understood that the work blank feeding apparatus 10 of this invention is suited for application in various machines such as point formers, slot formers and similar machines.

The machine 12 includes a pair of spaced parallel downwardly inclined feed rails 14 and 16 defining an elongated track 18 leading from a hopper, not shown, to a lower discharge end 20 of the feed rails 14, 16 adjacent an entrance 22 of a work station shown with a work blank 23 located in the entrance 22 in FIG. 3. The rails 14, 16 are spaced apart a distance sufficient to receive a shank of each blank (such as at 24 in FIG. 2) while supporting its head. The feed rails 14 and 16 have coplanar parallel work blank supporting surfaces 26 and 28 for supporting a column of work blanks to be conducted from the hopper to the work station which in the illustrated embodiment is shown as being a thread rolling station.

At this work station, a fixed die 30 is shown in the specifically illustrated embodiment as being secured to a bed 32 of the machine by a clamp 34, and a movable die 36 is mounted to be driven by any suitable mechanism (such as that shown in U.S. Pat. No. 3,117,473). The movable die 36 reciprocates in a direction parallel to the fixed die 30 to cooperate with the fixed die 30 to provide a thread rolling operation on the shank of each blank discharged into the work station from track 18. A clamp 38 is shown securing the movable die 36 to a movable slide 40. A movable combination gate and starter finger 42 of a type also shown in the referenced U.S. Pat. No. 3,117,473 is provided between the dies 30, 36 to control discharge of individual work blanks from the feed rails 14, 16 one at a time each time the finger 42 opens and closes, to wedge the work blanks in succession between the dies 30, 36 at the beginning of each thread rolling operation. For a detailed description of the thread rolling machine and its operation reference is made to the above-identified U.S. Pat. No. 3,117,473.

FIG. 1 shows the dies 30, 36 at the beginning of the thread rolling operation on work blank 44 which moves past the work station entrance 22 in a feeding direction, shown by arrow 45, by the starter finger 42 after blank 44 is discharged from the feed rails 14, 16. More specifically, as the movable die 30 moves to the left, as viewed in FIG. 1, to its fully retracted position, starter finger 42 moves in the direction of arrow 46 to reach its fully retracted position shown in broken lines at 48. The force of gravity moves the blank out of the downwardly inclined feed rails 14, 16 and into a location engageable with the movable die 36 adjacent the upstream or leading edge of the fixed die 30, which location is referred to as the entrance 22 of the work station (see blank 23, FIG. 3).

An elongated track cover 50 is mounted on the bed 32 in overlying coextending relation to the discharge end 20 of the track 18 to extend upwardly toward the hopper, not shown, to guide work blanks along the feed rails 14, 16 in a predetermined position as they are delivered along the track 18 toward the dies 30, 36. To permit removal of any malformed blank which may impede blank discharge into the dies 30, 36, a movable extension end or cover 52 is provided at the lower discharge end of a main cover 54 of track cover 50 to facilitate quick and easy removal of any defective work blank with minimum disturbance of the blanks being fed during clearing of the machine. The main cover 54 is elongated and generally rectangular in cross section and is supported by adjustable mounting bracket assemblies 56, 56 on bed 32 of the machine to extend above feed rails 14, 16 in parallel spaced relationship to the track 18 defined by the rails 14, 16. A cover of this general type having a hinged end extension is fully illustrated and described in U.S. Pat. No. 3,191,423 entitled "Feed Device for Thread Rolling Machines and the Like" and assigned to the assignee of this invention.

Extension cover 52 is pivotally connected to the lower discharge end of the main cover 54 and is movable in a plane normal to the plane of the feed rail supporting surfaces 26, 28 between an operative position shown in full lines in the drawing and a retracted inoperative position shown in broken lines (FIG. 3). In the inoperative position of extension cover 52, adjacent portions of a bottom guide face 58 on the extension cover 52 and a corresponding bottom guide face 60 on the main cover 54 are located in different planes with the extension cover 52 in an upper retracted position relative to the track 18, which in the specifically illustrated embodiment exposes work blank 23 in the work station and the next two adjacent upstream work blanks 62 and 64 (shown in broken lines in FIG. 3) in the discharge end 20 of the feed rails 14, 16 to provide access to such work blanks in the track 18.

The extension cover 52 in the illustrated embodiment is a relatively thin L-shaped block with a foot 66 integrally formed to project from a leg 68 of the extension cover 52. The latter is supported on the main cover 54 for swinging movement by a pivot pin assembly 70 extending through a discharge end 54A of the main cover 54 shown lapping the extension cover 52. The L-shaped configuration of the extension cover 52 provides a relieved cut-out therein behind the foot 66 which, with the extension cover 52 in operative position, receives a tongue 72 (FIG. 3) projecting longitudinally forwardly from the discharge end 54A of the main cover 54.

Undesired movement of extension cover 52 from its operative position relative to main cover 54 is effectively prevented by a biasing force imposed on extension cover 52 by a latching tension spring 74. A swivel hook 76 at one end of spring 74 is fixed to an anchoring pin 78 secured to the main cover 54, and a swivel hook 80 at the opposite end of spring 74 is anchored within a lateral opening 82 extending through the foot 66 of extension cover 52. Swivel hooks 76 and 80 at the ends of spring 74 are so located relative to pivot pin assembly 70 that extension cover 52 is retained under the biasing force of spring 74 in the last position to which extension cover 52 was moved.

Accordingly, when removal of a defective work blank from feed rails 14, 16 is desired, an operator may simply pivot extension cover 52 clockwise, as viewed in FIG. 3, into its broken line retracted inoperative position established by engagement of the top of extension cover 52 with an upper front wall 84 of main cover 54 (FIG. 3) wherein extension cover 52 will be maintained in its broken line retracted position by the biasing force of spring 74 until manually returned to its full line operative position, wherein extension cover 52 will again be retained under the force of spring 74 in operative position.

As the operating speed of the machine increases, the available time for locating a blank at the entrance 22 of the work station significantly decreases. For example, a thread rolling machine of the type illustrated and described in U.S. Pat. No. 3,117,473, e.g., when operated at speeds capable of rolling screws in the 0.045 inch diameter to 0.112 inch diameter range at 1,000 screws per minute permits approximately 6.7 milliseconds for a work blank within the discharge end 20 of the track 18 to be discharged into thread forming position at the leading edges of the dies 30, 36 at the entrance 22 of the work station. It is imperative that this transfer of each work blank is precisely accurate and is effected with continuous control exerted over each blank feed to the work station. Moreover, when such blanks in the 0.045 to 0.112 inch diameter range are being transferred, severe structural limitations are imposed on the size of mechanical components of the feeding apparatus relative to the size of the associated structural components normally permitted in the feeding of work blanks in the larger diameter ranges handled by conventional machines.

To effect constant flow of properly positioned and oriented work blanks down the feed rails 14, 16 for discharge from the track 18 with minimum troublesome jamming of the machine, while also ensuring that each shank is fully and uniformly threaded to the head of the blank, the feeding apparatus 10 of this invention not only ensures separate blank discharge with each shank in oriented position relative to the work station, but additionally provides for fully seating each blank with its head resting on blank supporting surfaces 86, 88 (top surfaces of dies 30, 36 in the depicted embodiment) at the work station.

More specifically, to "unshingle" the column of blanks fed into the discharge end 18 of the feed rails 14, 16 to preclude overlapping the heads of the blanks before dischage and to ensure precision control over the orientation of the shank of each discharged blank during transfer into the work station, extension cover 52 is designed for precision height adjustment of its entire bottom guide face 58 overlying the discharge end 20 of the feed rails 14, 16 upstream of the work station entrance 22, relative to the feed rails 14, 16 and the adjacent bottom guide face 60 of the main cover 54. The extension cover 52 of this specific embodiment is shown overlying the last two work blanks 62, 64 in the discharge end 20 of the feed rails 14, 16 (FIG. 3) to positively ensure "unshingling" of each blank before its transfer into the work station entrance 22 in the position occupied by blank 23. If necessary, the space between the work blank supporting surfaces 26, 28 of the feed rails 14, 16 and the overlying guide face 58 of the extension cover 52 in its operative position may be equal to or reduced relative to the clearance space between the rails 14, 16 and the main cover guide face 60.

To effect such adjustment, tongue 72 at the discharge end 54A of the main cover 54 is provided with an exposed upper abutment surface 90 which, with the extension cover 52 in operative position, engages a lowermost end of a height adjustment screw 92 (FIG. 3) shown threadably connected to the extension cover 52 and extending through a tapped hole in its leg 68. Precision adjustment of the bottom guide face 58 on the foot 66 of the extension cover 52 in its operative position is accordingly accomplished by raising or lowering the extension cover 52 in its entirety, depending on the direction of rotation of the height adjustment screw 92 with its lowermost end serving as a stop engageable with the upper abutment surface 90 on the tongue 72 of the main cover 54.

Thus, with the column of blanks in the feed rails 14, 16 in head-to-head engagement and the concomitant tendency toward undesired tilting of a blank during its transfer into the work station, caused by engagement of the next adjacent upstream work blank, the adjustment of the extension cover guide face 58 relative to a plurality of work blanks situated in the discharge end 20 of the feed rails 14, 16 effectively precludes undesired machine jamming and unnecessary production of scrap even when small blanks are being handled at high production rates.

Precise seating of the head of each work blank at the entrance 22 of the work station for a variety of different work blanks, even of relatively small size, also must be ensured so that the work on the shank is effectively performed. I.e., in a thread rolling operation, as an example, the shank of each blank must be entirely threaded right to its head regardless of size, and despite a structural environment severely limited in size due to the small size of the blanks being fed, to produce a quality product. A variable force blank seating construction is accordingly provided by this invention to achieve these seemingly incompatible aims in a mechanical structure which provides no allowance for springs or other conventional hold-down apparatus.

An air ejection hold-down orifice 94 is shown in the preferred embodiment as being formed in the guide face 58 of the extension cover foot 66 in overlying relation to the entrance 22 of the work station with the orifice 94 centrally located above the work blank supporting surfaces 86, 88 at the work station but in adjacent downstream relation to the discharge end 20 of the feed rails 14, 16. To ensure that the head of each work blank discharged from the feed rails 14, 16 is firmly seated on the work blank supporting surfaces 86, 88 of the work station, the orifice 94 as described is slightly offset (FIG. 2) in a feeding direction (arrow 45) relative to a major longitudinal axis 95 of the track 18 extending between the feed rails 14, 16 such that the head of each work blank will be positively forced into engagement with the supporting surface 86, 88 as the leading work blank being transferred from the track 18 into the path of the starter finger 42 is moved with a translatory motion relative to the feed rails 14, 16 and into the work station with minimum tendency to tilt.

The downward component of the pneumatic force which strikes the top of the discharged work blank ensures positive seating of its head against the supporting surfaces 86, 88 of the work station. The orifice 94 is connected by a passageway 96, extending through the foot 66 of the extension cover 52, with a conventional source of compressed air, not shown, through a supply line provided by tubing 97. An ON/OFF valve control 98 is provided in the supply line and may be turned on and off, if desired, with the machine for the purpose of automatically activating and deactivating the feeding apparatus 10. A flow regulating valve 100 of a conventional type may be installed in the line downstream of the ON/OFF valve control 98 to selectively control a continuous stream of air through orifice 94 to customize the air ejection hold-down force directed onto the head of each discharged work blank at the entrance 22 of the work station for maximum flexibility in handling work blanks of different size and mass distribution, while ensuring uniformity in the production of fully threaded shanks, e.g., of the blanks being formed at the work station.

The above described apparatus has been found to be easily adjusted during machine set-up to effectively feed properly oriented work blanks, even those of extremely small size, at high production rates with minimum machine down-time.

As will be apparent to persons skilled in the art, various modifications, adaptations, and variations of the foregoing specific disclosure can be made without departing from the teachings of this invention.

I claim:

1. For use in feeding work blanks to an entrance of a work station wherein the work blanks each have a shank and a head of enlarged diameter relative to the shank, an apparatus comprising a pair of spaced feed rails defining a track leading to the entrance of the work station, the feed rails having a discharge end, the work station entrance being located in adjacent downstream relation to the discharge end of the feed rails, the feed rails and the work station respectively having a pair of work blank supporting surfaces spaced apart for supporting heads of the work blanks being handled, a track cover in overlying spaced relation to the feed rails, the track cover having an end projecting beyond the discharge end of the feed rails, an air ejection orifice formed in said end of the track cover in overlying relation to the entrance of the work station, and passage means including an air supply line connected to the orifice for directing air under pressure from the orifice onto the top of each work blank upon its discharge from the feed rails to positively seat the work blank head on the supporting surfaces at the entrance of the work station.

2. The apparatus of claim 1 wherein the track cover has a bottom guide face in overlying spaced relation to the feed rails, the track cover including a movable extension end overlying the work blank supporting surfaces of the feed rails at their discharge end for work blank engagement upstream of the work station, and wherein a selectively variable height adjustment device is provided for establishing optimum spacing between the supporting surfaces at the discharge end of the feed rails and the overlying bottom guide face of the extension end of the track cover to precisely control feeding of each work blank from the discharge end of the feed rails before transfer of that work blank to the work station.

3. The apparatus of claim 1 wherein the air ejection orifice formed in said end of the track cover is centrally located between the work blank supporting surfaces of the work station but is offset in downstream relation to a major axis of the track longitudinally extending between the work blank supporting surfaces of the feed rails.

4. The apparatus of claim 1 further including an ON/OFF valve control in the air supply line for activating and deactivating the air ejection orifice, and wherein the passage means includes a second valve downstream of the ON/OFF valve control with the second valve serving to selectively vary air flow through the air ejection orifice.

5. For use in feeding work blanks to an entrance of a work station wherein the work blanks each have a shank and a head of enlarged diameter relative to the shank, an apparatus comprising a pair of spaced feed rails defining a track leading to the entrance of the work station, the feed rails having a discharge end, the work station entrance being located in adjacent downstream relation to the discharge end of the feed rails, the feed rails and the work station respectively having a pair of work blank supporting surfaces spaced apart for supporting the heads of the work blanks being handled, and a track cover having a bottom guide face in overlying spaced relation to the feed rails, the track cover including a movable extension end overlying the work blank supporting surfaces of the feed rails at their discharge end for work blank engagement upstream of the work station, and a selectively variable height adjustment device for establishing optimum spacing between the supporting surfaces at the discharge end of the feed rails and the overlying bottom guide face of the extension end of the track cover to precisely control feeding of each work blank from the discharge end of the feed rails before transfer of that work blank to the work station.

6. The apparatus of claim 5 wherein the extension end of the track cover overlying the work blank supporting surfaces of the feed rails at their discharge end is dimensioned and configured for engagement with a plurality of work blanks upstream of the work station.

7. The apparatus of claim 5 wherein the track cover includes a main cover having a longitudinally projecting tongue adjacent the discharge end of the feed rails and having an upper abutment surface, wherein the extension end of the cover is supported for swinging movement between an operative position and a retracted position, the extension cover being of L-shaped configuration including a leg pivotally supported on the main cover for movement toward and away from said operative position in overlying relation to the upper abutment surface of the tongue of the main cover, the extension cover having a foot integrally formed with the leg of the extension cover, said bottom guide face of the extension end being formed on the foot for overlying the work blank supporting surfaces of the feed rails at their discharge end, said height adjustment device being mounted on the leg of the extension cover to project therefrom for engagement with the upper abutment surface of the main cover tongue for establishing said optimum spacing between the supporting surfaces at the discharge end of the feed rails and the overlying bottom guide face of the extension end of the track cover.

8. The apparatus of claim 7 wherein the leg of the extension end of the track cover is pivotally movable in a plane normal to the plane of the feed rail supporting surfaces between said operative position, wherein the bottom guide face of the extension end of the track cover is longitudinally aligned with the bottom guide face of the main cover, and its retracted inoperative position wherein adjacent portions of the bottom guide faces of the extension end and the main cover are located in different planes with the extension end disposed in an upper retracted position relative to the track to expose the work blanks in the discharge end of the feed rails.

9. The apparatus of claim 7 wherein said height adjustment device comprises an adjustment screw threadably connected to the leg of the extension end of the track cover to project therefrom for engagement with the upper abutment surface of the main cover tongue for selectively establishing said optimum spacing by raising and lowering the extension end in its entirety relative to the main cover and the underlying work blank supporting surfaces of the feed rails.

10. The apparatus of claim 5 wherein the extension end of the track cover is dimensioned to extend beyond the discharge end of the feed rails, wherein an air ejection orifice is formed in the extension end of the track cover in overlying relation to the entrance of the work station, and wherein passage means are provided including an air supply line connected to the orifice for directing air under pressure from the orifice onto the top of each work blank upon its discharge from the feed rails to positively seat the work blank head on the work blank supporting surfaces at the entrance of the work station.

* * * * *